Feb. 2, 1926. 1,571,816
A. SUGDEN
POWER TRANSMISSION FOR TRAINS
Original Filed Sept. 13, 1923
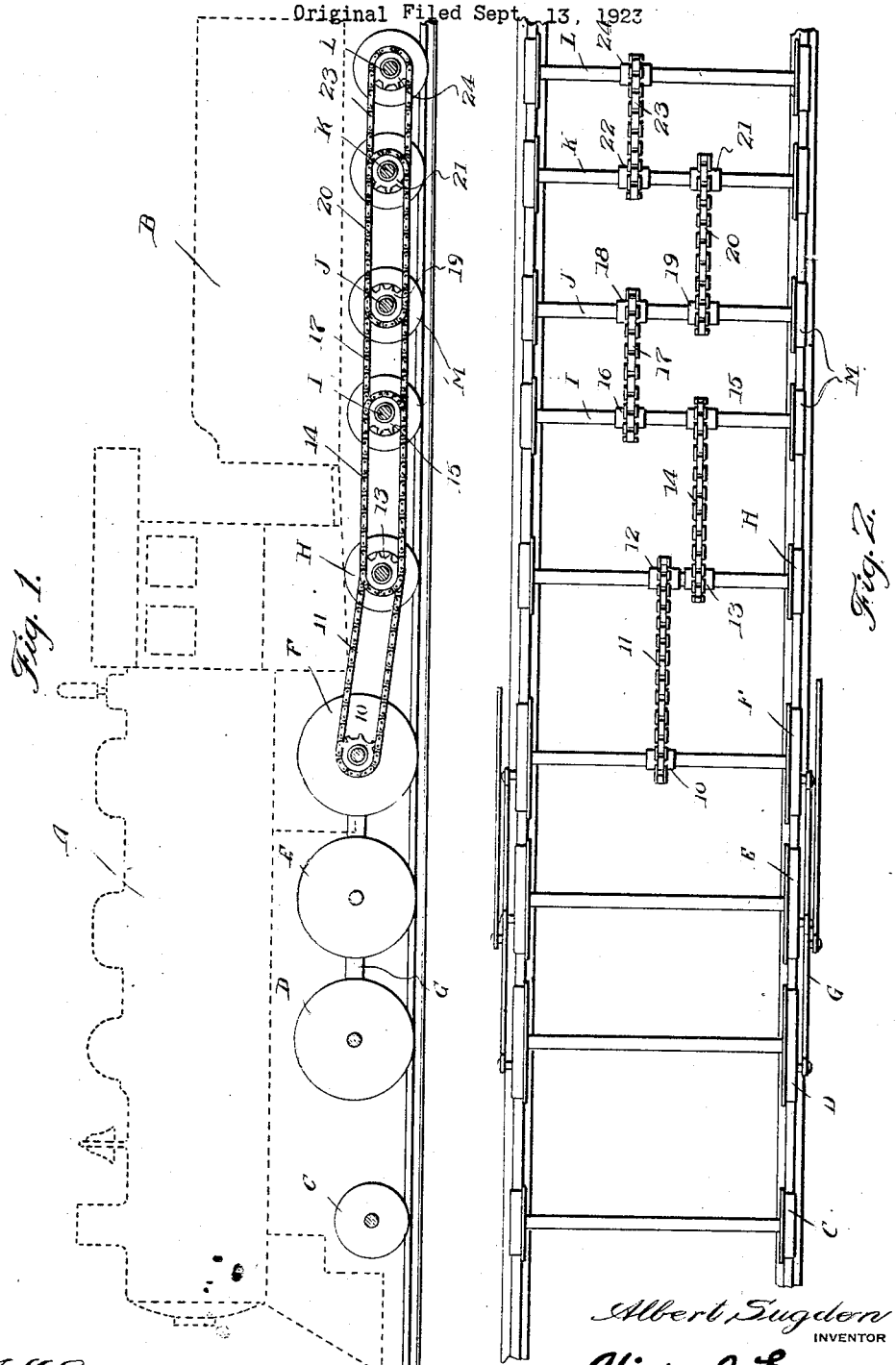

Patented Feb. 2, 1926.

1,571,816

UNITED STATES PATENT OFFICE.

ALBERT SUGDEN, OF STRATFORD, ONTARIO, CANADA.

POWER TRANSMISSION FOR TRAINS.

Application filed September 13, 1923, Serial No. 662,503. Renewed May 27, 1925.

*To all whom it may concern:*

Be it known that I, ALBERT SUGDEN, a subject of the King of Great Britain, residing at Stratford, in the Province of Ontario and Dominion of Canada, have invented new and useful Improvements in Power Transmissions for Trains, of which the following is a specification.

This invention relates to power transmission mechanism and has for its object the provision of a power transmitting device for use on locomotives and their tenders whereby the tender wheels will be positively driven and the tractive effect consequently greatly increased.

With the above and other object and advantage in view, the invention consists in the details of construction to be hereinafter more fully described and claimed and illustrated in the accompanying drawings, in which:

Figure 1 is a somewhat diagrammatic section taken longitudinally through the running gear of a locomotive and tender and showing my invention application, and Figure 2 is a plan view.

Referring more particularly to the drawings the letter A designates, diagrammatically, a locomotive while B represents the tender thereof. C indicates the front truck of the locomotive, D the front driving wheels and E and F the other drivers which are operated in unison by connecting rods G, while H indicates the rear wheels under the fire box. As is well known the tender is provided with four axles I, J, K, and L which carry the wheels M.

In carrying out my invention I provide a sprocket 10 on the axle of the wheels F and about the sprocket is trained a chain 11, which is, trained about a sprocket 12 on the axle of the wheels H. This same axle carries a sprocket 13 about which is trained a chain 14 engaged over a sprocket 15 on the axle I. This axle drives the axle J through the instrumentality of a sprocket 16 on the axle I engaged by a chain 17 trained about a sprocket 18 on the axle J which in turn carries a second sprocket 19 driving a chain 20 which engages a sprocket 21 on the axle K. I also provide a sprocket 22 on the axle K which drives a sprocket 24 on the axle L by means of a chain 23.

In the operation it will be seen that the power of the driving wheels of the locomotive is applied to all the axles not only of the tender but also the axle which supports the wheels under the fire box of the engine. In this way it is obvious that the traction effect and consequently the pulling power will be greatly increased so that a locomotive and tender equipped with my invention is better qualified to climb grades and pull heavy loads than any ordinary locomotive.

While I have shown and described the preferred embodiment of the invention it is of course to be understood that I reserve the right to make such changes in the form, construction and arrangement of parts as will not depart from the spirit of the invention or the scope of the subjoined claim.

Having thus described my invention I claim:

In a locomotive and tender having a drive axle, a sprocket on the shaft of the locomotive wheels mounted beneath the fire box, a sprocket on the drive axle, a chain trained about both sprockets, drive connections between all the axles of the tender and a drive connection between the axle of the wheels below the fire box and the adjacent axle of the tender.

In testimony whereof I affix my signature.

ALBERT SUGDEN.